United States Patent [19]

Scola

[11] Patent Number: 4,801,682

[45] Date of Patent: * Jan. 31, 1989

[54] HIGH TEMPERATURE FLUORINATED POLYMER

[75] Inventor: Daniel A. Scola, Glastonbury, Conn.

[73] Assignee: United Technologies Corporation, Hartford, Conn.

[*] Notice: The portion of the term of this patent subsequent to May 3, 2005 has been disclaimed.

[21] Appl. No.: 867,719

[22] Filed: May 27, 1986

[51] Int. Cl.[4] ............................................. C08G 73/10
[52] U.S. Cl. .................................... 528/353; 528/352; 528/229; 528/188
[58] Field of Search ................ 528/353, 352, 229, 188

[56] References Cited

U.S. PATENT DOCUMENTS

| 3,310,573 | 3/1967 | Coe | 549/241 |
|---|---|---|---|
| 3,356,648 | 12/1967 | Rogers | 528/353 |
| 3,705,870 | 12/1972 | Darmory et al. | 524/726 |
| 4,063,984 | 12/1977 | Critchley | 524/408 |
| 4,307,024 | 12/1981 | Kray et al. | 260/389 |
| 4,336,175 | 6/1982 | Gibbs | 524/726 |
| 4,569,988 | 2/1986 | Scola et al. | 528/353 |

FOREIGN PATENT DOCUMENTS 1062435  3/1967  United Kingdom .
1216505 12/1970  United Kingdom .

OTHER PUBLICATIONS

Paper Titled "Synthesis of Multifunctional Triarylfluoreithanes". 1. Condensation of Fluoro Ketones by William D. Kray and Robert W. Rosser; J. Org. Chem., vol. 42, No. 7, 1977, pp. 1186–1189.

Primary Examiner—Maurice J. Welsh
Assistant Examiner—M. L. Moore

[57] ABSTRACT

High temperature fluorinated polyimides having repeating polymer units comprising

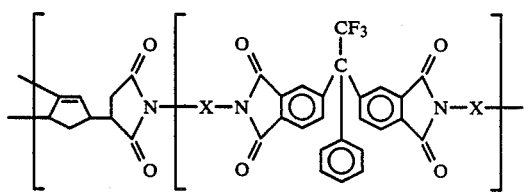

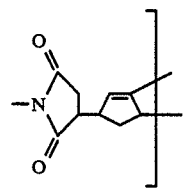

wherein X is diamine. Typically, these polyimides are the copolymerization product of about 3 mole % to about 42 mole % nadic esters; about 39 mole % to about 49 mole % diamine; and about 17 mole % to about 48 mole % 4,4'9(2,2,2-trifluoro-1-phenylethylidene)-bipthalic tetra carboxylic acid dialkylester. These polimides provide the high strength properties at high temperatures yet they can be processed into solid polymers, fibers, films and composites at low temperatures and pressures.

6 Claims, No Drawings

HIGH TEMPERATURE FLUORINATED POLYMER

CROSS REFERENCES

This application relates to commonly assigned copending applications Ser. No. 06/867719, 5-27-86 filed on even date herewith entitled "Monomers for High Temperature Fluorinated Polyimides" and "High Temperature Fluorinated Polyimides" respectively, which disclose material related to that contained herein the disclosures of which are hereby incorporated by reference.

DESCRIPTION

1. Technical Field

The field of art to which this invention pertains is high temperature fluorinated polymers and methods of making the same.

2. Background Art

Composites are increasingly used as replacements for metal components in aerospace applications. Composites offer a variety of advantages over their metal counterparts such as lightweightness, improved strength, and the use of fewer components. Many of these components must be capable of withstanding elevated temperatures of about 200 degrees centigrade (° C.) to about 400° C. (e.g. when they are in close proximity to gas turbine engines). A few high temperature polymers exist, such as PMR ™ 15 polyimide (NASA Lewis) which is licensed to various companies (Ferro Corporation, U.S. Polymeric, etc.; Culver City, Calif. and Santa Ana, Calif.) HR600 ™ polyimide (National Starch, Bridgewater, N.J.) and NR150B2 ™ polyimide (E.I. DuPont de Nemours, Wilmington, Del.). However, high temperatures of about 300° C. to about 400° C. and high pressures of about 1000 psi to about 5000 psi can be required to process these resins into composites or resin parts. At these high temperatures, for example, the pressure bags that are used in composite autoclave processing can fail.

Accordingly, there has been a constant search in this field of art for high temperature resins and their precursor monomers that can be processed at lower temperatures and pressures.

DISCLOSURE OF INVENTION

The disclosure of this invention is directed to high temperature fluorinated polyimides having repeating polymer units comprising

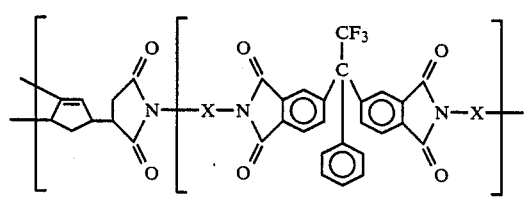

-continued

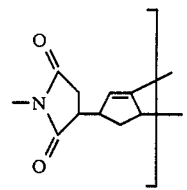

wherein X is a diamine.

Another aspect of this invention is the high temperature fluorinated polyimides comprising the copolymerization product of about 3 mole % to about 43 mole % nadic ester; about 39 mole % to about 49 mole % diamine; and about 17 mole % to about 48 mole % 4,4'(2,2,2-trifluoro-1-phenylethylidene)-bipthalic tetracarboxylic acid dialkyester.

These polyimides make a significant contribution to the aerospace industry since they have high strengths at elevated temperatures, yet can be processed at low temperatures and pressures.

The foregoing and other objects, features and advantages will be apparent from the specification, claims which will illustrate an embodiment of the invention.

BEST MODE FOR CARRYING OUT THE INVENTION

Xylene available from J. T. Baker Company, (Phillipsburg, N.J.) and trifluoroacetophenone available from Aldrich Chemical Company (Milwaukee, Wis.) react in the presence of a strong Friedel-Crafts acid catalyst such as trifluoromethyl sulfonic acid available from Aldrich Chemical Company (Milwaukee, Wis.) resulting in a monomer used in making these fluorinated polyimides. The reaction product is 1-phenyl-1,1-bis(3,4-xylyl)-2,2,2-trifluoroethane depicted empirically below and hereinafter referred to as 3F-tetramethyl.

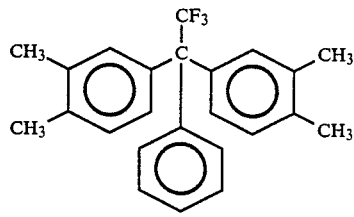

3F-tetramethyl is oxidized in the presence of a strong oxidizing agent such as potassium permanganate, chromic acid or nitric acid available from J. T. Baker Chemical Company (Phillipsburg, N.J.) to form the corresponding tetra-acid; 4,4'(2,2,2-trifluoro-1-phenylethylidene) -biphthalic tetracarboxylic acid, also called 1,1,1-trifluoro-2-phenyl-2-bis(4,4'-phthalic acid) ethane, which is depicted empirically below and hereinafter referred to as 3F-tetra acid.

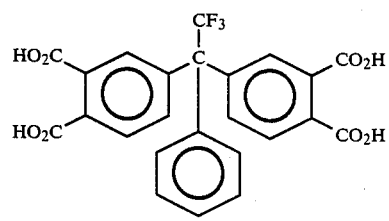

3F-tetra acid is dehydrated preferably with heat or alternatively with an anhydride such as an aliphatic anhydride preferably acetic, propionic or butanoic anhydride. Acetic anhydride is available from J. T. Baker Chemical Company (Phillipsburg, N.J.). The dehydration results in the dianhydride; 4,4'(2,2,2-trifluoro-1-phenylethylidene)-biphthalic tetra carboxylic acid dianhydride which is depicted empirically below and hereinafter referred to as 3F-dianhydride.

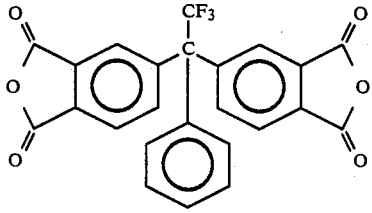

The dianhydride 4,4'(2,2,2-trifluoro-1-phenylethylidene)-bipthalic tetra carboxylic acid dianhydride described above can be esterified with an alcohol, preferably a short chain alcohol, such as methanol, ethanol, propanol, butanol, hexanol, isopropanol, isobutanol and tert-butanol available from J. T. Baker Company (Phillipsburg, N.J.) to produce the dialkylester; 4,4'(2,2,2-trifluoro-1-phenylethylidene)-bipthalic tetracarboxylic acid dialkylester, hereinafter referred to as 3F-dialkylester depicted empirically below.

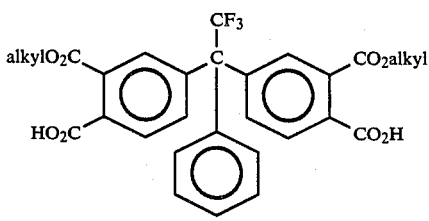

The above monomers (the 3F-dialkylester of which is used in making the polyimides of this disclosure) may be made using the following procedures. It is preferable to dissolve trifluoroacetophenone in a molar excess preferably about 10 to 1 of xylene at about 20° C. to about 25° C. (room temperature) under slight agitation for about 2-4 days. The molar excess is preferred because it increases the product yield. In contrast to the following autoclave method, this method is preferable because yields are considerably higher and it is carried out under ambient conditions. The 3F-tetramethyl compound which precipitates out is easily filtered and washed with an alcohol solution yielding a clean white solid. Alternatively, the xylene and trifluoroacetophenone can be mixed in an autoclave under ambient pressures for about 3 to about 5 hours at a temperature of about 125° C. to about 175° C. in the presence of about 4 to about 12 weight percent (%) trifluoromethyl sulfonic acid yielding the 3F-tetramethyl compound. This reaction is depicted empirically below.

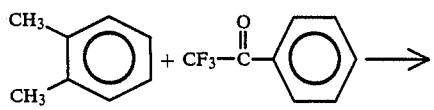

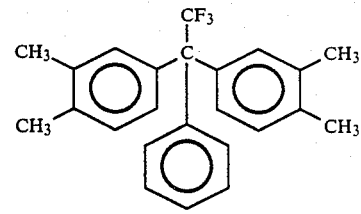

About 25% to about 35% nitric acid (about 3.0 moles nitric acid per mole of methyl group to about 3.6 moles nitric acid per methyl group) is added to the 3F tetramethyl compound and the resulting slurry is heated at about 150° C. to about 250° C. for about 0.5 to about 1.5 hours in an autoclave under ambient pressure. Beyond about 1.5 hours a high percentage of undesirable side products such as nitration products result. After heating the reaction is cooled rapidly resulting in the 3F-tetra acid. This reaction is depicted empirically below.

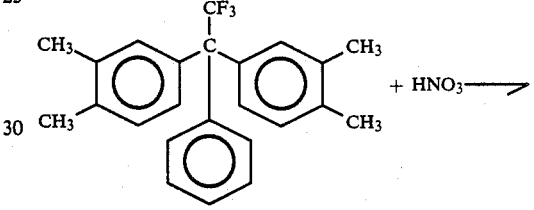

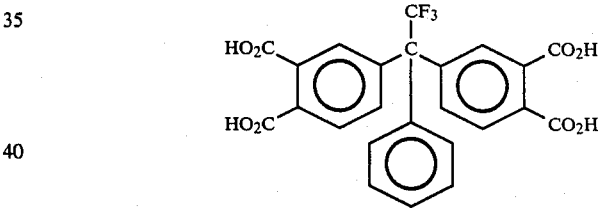

It is preferable to treat the 3F-tetra acid at about 180° C. to about 240° C. for about 1 to about 3 hours under about 1 mm to about 30 mm vacuum because this results in a high yield of pure product. Under these conditions, water is removed and the 3F-dianhydride is formed. Alternatively, the 3F-tetra acid is dissolved in about 5 to about 15 molar excess of acetic anhydride and refluxed for about 0.5 to about 2 hours. It is subsequently cooled to about 0° C. to about 25° C. (room temperature) to precipitate a white crystalline solid (3F-dianhydride) which is filtered and air-dried. This reaction is depicted empirically below.

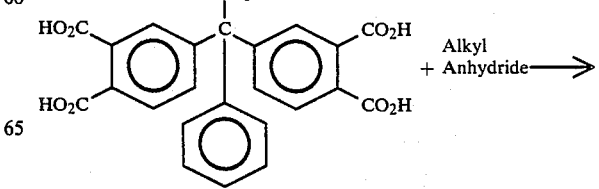

-continued

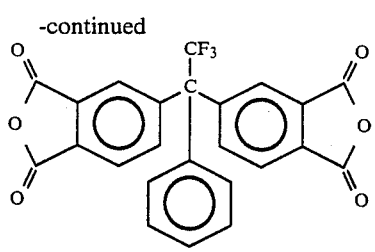

The dianhydride described above can be esterified. The 3F-dianhydride is preferably dissolved in about 5 to about 10 molar excess of alcohol and refluxed for about 2 to about 4 hours at which time the excess alcohol is evaporated under 30 mm to about 1 mm vacuum at a temperature below about 40° C. Above about 40° C., the reverse reaction to dianhydride can occur. The below reaction and resultant clear amber solid 3F-dialkylester are depicted empirically below.

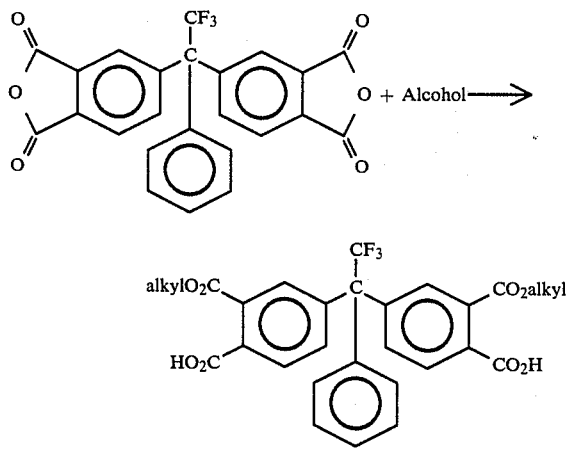

The second (of three) monomers used in making the PMR high temperature fluoronated polymers of this disclosure is a 5-norbornene type compound depicted empirically below where X can be any alkyl substituent.

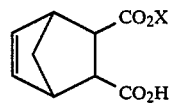

5-norbonene-1,2-dicarboxylic acid anhydride (also called nadic anhydride and its mono ester derivatives (also called nadic ester) are available from Aldrich Chemical Company (Milwaukee, Wis.), and Burdick and Jackson Laboratories, Inc. (Muskegon, Mich.), respectively. The nadic anhydride can also be made by reaction of cyclopentadiene with maleic anhydride. The monoester can be made by refluxing the nadic anhydride with excess alcohol (methanol in a mole ratio of about 10 to about 1.

The third monomer used in making the PMR high temperature fluorinated polymers from polymerizeable monomer reactants (PMR) of this disclosure is a diamine. There are a variety of aromatic and aliphatic diamines that can be used in the practice of this invention. The diamines are limited to those which are soluble in the particular solvent, preferably an alcohol, used in making a soluble monomer solution of the reactants.

Methylene dianilene is especially preferred because of its high solubility in low molecular weight alcohols (methanol, ethanol) and because of the excellent high temperature performance in the present invention (high Tg after processing at low temperatures, e.g. 316° C.). According to the formula $NH_2-X-NH_2$, it is preferred that X is para or ortho linked phenylene or biphenylene because of the thermal stability provided by these groups. The para linkage is preferred over the ortho because there is no restriction due to steric consideration present in the ortho isomer. The steric hindrance for the polymer with the ortho isomer causes reduced thermal stability.

The diamines can also have the formula

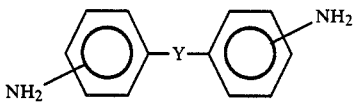

where Y is methylene ($CH_2$), sulfone ($SO_2$), sulfoxide (SO), carbonyl (CO), oxide (O), sulfide (S), aromatic and/or aryloxy groups. Of these functionalities, methylene and oxide are preferred because of ease of processability and excellent thermal stability. However, the sulfone group is preferred if the highest thermal stability is desired. It is not preferred that Y is an alkylene group because the resulting polyimides may not have the high temperature properties typically desired.

The diamines can also comprise any of a number of fused aromatic rings, such as naphthalene, anthracene, phenanthrene, indene and triphenylene. The diamine may also comprise a number of heteroaromatic ring systems such as quinoline, pyridine, acridine, thiophene and indole.

Typically, the naphthalene aromatic fused ring diamine systems can have the diamine linkage in the positions (1,2), (1,3), (1,4), (1,5), (1,6), (1,7), (1,8), (2,3), (2,4), (2,5), (2,6), (2,7), (2,8) with the (1,4), (1,5), (1,7), (2,6) and (2,8) positions

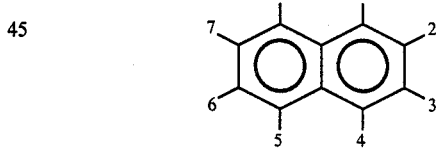

favored because of the greater thermal stability of the resultant polymers. It is also preferred that the fused aromatic ring is naphthalene because of its stability. Typically, the anthracene diamine can have the diamine linkage in the positions

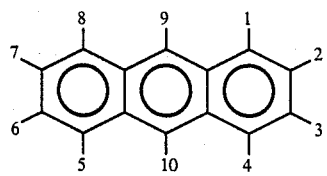

(1,2), (1,3), (1,4), (1,10), (1,5), (1,6), (1,7), (1,8), (1,9), (2,3), (2,4), (2,5), (2,6), (2,7), (2,8), (2,9) and (2,10) with positions (1,7, (1,4), (2,6), and (2,9) favored because of the greater stability of the resultant polymers. The above described diamines are not meant to be an exhaustive list of those diamines that can be advantageously utilized in the practice of this invention and those skilled in the art will know other diamines that may be used in this invention. The polyimides formed from the above described monomers have the repeating units

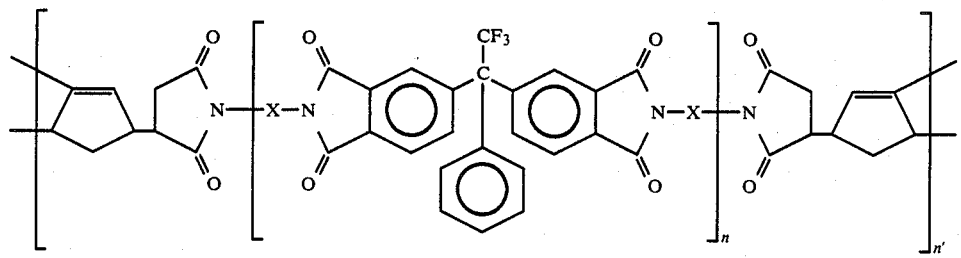

wherein X is a diamine. Typically n is about 1 to about 50 and n' is about 2 to about 20.

The nadic ester, diamine and 3F-dialkylester are combined (copolymerized) in the mole percent of about to about 43%, preferably about 32% nadic ester, about 39% to about 49%, preferabley about 42% diamine and about 17% to about 48%, preferably about 26% 3F-dialkylester. The polyimide end properties are very sensitive to the mole ratios used.

The polyimides of this disclosure can be made by dissolving the diamine and the nadic ester in an alcohol solution of the 3F-dialkyester. The mixture is heated below about 40° C. preferably under vacuum to yield a yellow powder. The resultant oligomer (prepolymer) powder or the alcohol solution can be processed to the polyimide by a variety of paths. For example, the monomer solution can be used to impregnate a fiber bundle yielding a monomer film with traces of solvent. The solution can be applied to surfaces other than fibers to form monomer films. The monomer films are further processed up to 150° C. The polyamic and powder or films as described above can be further processed for about 1 to 3 hours at temperatures of about 275° C. to 316° C., utilizing optional pressure resulting in the polyimide. It is preferred to post-cure the polymer at temperatures of about 316° C. to about 325° C. for about 4 hours to about 24 hours under optional pressure of about 100 psi to about 1000 psi to achieve the maximum high temperature polymer properties.

Alternatively, the oligimer solid is processed at about 275° C. to about 316° C., preferably under pressures of about 100 to about 1000 psi. The polymer is processed (post-cured) at about 316° C. to about 325° C. for about 4 hours to about 24 hours to yield the polyimide of this disclosure. Alternatively, the polyamic acid solid can be added to ortho toluene or xylene and refluxed while removing water to produce the polyimide.

These polyimides can be used as composite resins in conjunction with a variety of fibers such as boron, graphite, carbon, polymeric fibers, glass, silicon carbide, aluminum oxide and ceramic fibers. It is preferred that the fibers are graphite or boron because of the high modules. An exemplary material is Celion 6000 fiber available from (BASF, Parsippany, N.J.)

The monomer solution can be used to impregnate tapes for composites which are then treated at elevated temperatures of about 200° C. to about 350° C. for about 3 hours to about 6 hours and optionally pressures of about 100 psi to about 2000 psi resulting in high temperature composites.

The solution of monomers can also be used to impregnate graphite or glass fibers by adding solvent (e.g. methanol) to give a 50 weight % solution. The impregnated fiber (graphite or glass) can be assembled into a laminated and processed similarly to the neat resin.

EXAMPLE I

Into a three neck round bottom flask equipped with stirrer reflux condenser and addition funnel was added 600 ml o-xylene, 50g (0.287 mole) of trifluoroacetophenone and 25 g of trifluoromethane sulfonic acid. The reaction mixture was stirred for 72 hours at room temperature. The solution was washed with water to remove trifluoromethane sulfonic acid. A white solid precipitated from the washed organic layer, which after filtration, washing in cold ethanol, and drying, weighed 81.4 g (77% yield) mp 178.5°–180° C.

This 3F-tetramethyl compound was characterized by infrared and NMR spectroscopy, high pressure liquid chromatography for purity and elemental analyses.

Calculated $C_{24}H_{23}F_3$: C, 78.23; H,6.29; F,15.47. Found: C, 78.12; H,6.28; F,15.47.

In a stainless steel autoclave 10 g (0.027 mole) of 3F-tetramethyl and 6.8 ml of 30% nitric acid were added. The autoclave was sealed and the reaction mixture was heated to 200° C. for 1 hour and then cooled immediately. The cooled mixture was removed from the reaction vessel. The excess acid was removed in a rotary evaporator to yield a pale yellow solid (14.2 g). The pale solid was dried at 80° C. in a vacuum to yield a pale yellow crystalline material 13.6 g (96% yield) mp 110°–114° C. (foamed). Elemental analyses showed it to be the dihydrate of the 3F-tetra-acid.

Calculated $C_{24}H F_3O_{10}$: C,54.98; H,3.65; F,10.87; Found: C,54.70; H,3.46; F,10.84.

The monohydrate of the 3F-tetra-acid was obtained by treatment of the product isolated as described above at 60° C. for 1 hour.

Calculated $C_{24}H_{17}F_3O_9$: C.56.92; H,3.38; F,11.26. Found: C,56.21; H,3.02; F,10.38.

The tetra-acid 8.20 g (0.0168 mole) was heated at 90° C. for 1 hour to yield 7.729 g dianhydride, mp 20°–125° C. Elemental analyses gave the following results:

Calculated $C_{24}H_{11}F_3O_6$: C, 63.72; H,2.45; F, 12.60. Found: C,62.2; H,2.48; F,12.51.

2.24 grams (g) (0.05 mole) 3F-dianhydride was dissolved in 12 cubic centimeters (cc) of absolute ethanol and refluxed for about 40 minutes to yield 2.70 g (0.05 mole) 3F-diethylester.

To a solution of 3F-dimethylester 1.141 g (0.00221 mole) in 1.961 g anhydrous methanol was added 0.364 g (0.00186 mole) of the monomethylester of 5-norbornene-1,2-dicarboxylic acid, and 0.5668 g (0.00286 mole)

of 4,4'-methylendianiline. The solution was concentrated at room temperature, then heated at 60° C. in vacuum for 1 hour resulting in a yellow powder. The prepolymer yellow resin (1.4 g) was placed in a 1" diameter mold, and cured at 210° C. for 2 hours with no pressure, and then cured at 316° C. for 2 hours at a pressure of 1000 psi. The solid PMR-3F polymer had a density of 1.316 g/cc. Post curing at 316° C. for 12.5 hours did not change the density. The glass transition temperature of this polymer was 360° C.

TABLE I

| Properties of Polymer | 3F | PMR-15 | NR-150B |
|---|---|---|---|
| Glass transition temperature after 316° C. cure for 1 hour | 346° C. | 320° C. | 285° C. |

| Properties of Celion 6000/3F Composite Processed at 316° C. for 1 hour at 1000 psi | | |
|---|---|---|
| | RT | |
| | Flexural Strength ksi | Flexural Modulus $10^6$ psi |
| Celion 6000/3F | 111 | 19.9 |
| DuPont Celion 6000/ NR-150B2 | 17.4 | 2.86 |

| | Shear Strength, ksi | |
|---|---|---|
| | RT | 600° F. (310° C.) |
| Celion 6000/3F | 3.34 | 3.47 |
| DuPont Celion 6000/ NR-150B2 | 2.54 | 0.887 |

In contrast with other high temperature polymers these polyimides have superior high temperature properties when processed at lower temperatures and pressures of about 300° C. to about 320° C. and 100 psi to 500 psi. For example, the polyimides of this disclosure have better strengths and other properties than such high temperature polymers as DuPont NR-150B2 as illustrated in the preceding table.

These polymers make a significant advance in the field of high temperature polymers. Either as solid polymers, fibers, films or when incorporated into composites they provide the strength properties at high temperatures desired for aerospace applications. The polymers and composites made thereof have high flexural strengths, tensile strength, strain to failure, compression strength, shear strength, and flexural fatigue. Their excellent properties at high temperatures when processed at low temperatures and pressures give them a distinct advantage in this field of art. This advantage and the fact that they are processed from readily available cheap starting materials resulting in high yielding reactions facilitates their use in aerospace applications.

It should be understood that the invention is not limited to the particular embodiment shown and described herein, but that various changes and modifications may be made without departing from the spirit or scope of this concept as defined by the following claims.

I claim:

1. High temperature fluorinated polyimides having repeating polymer units comprising:

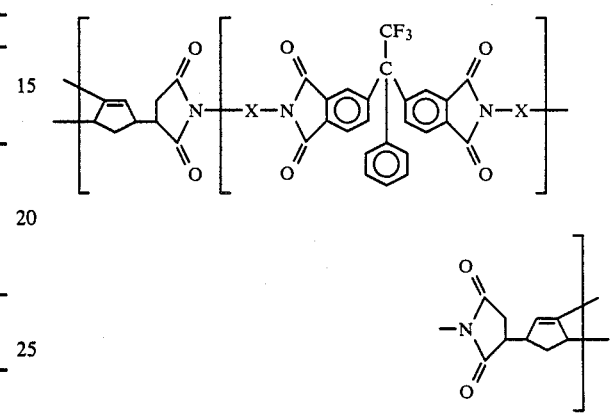

wherein X is a diamine.

2. The high temperature fluorinated polyimides as recited in claim 1 wherein X is 4,4'-methylene diphenylene.

3. High temperature fluorinated polyimides comprising the copolymerization product of the copolymerization of
   a. about 3 mole % to about 43 mole % nadic esters;
   b. about 39 mole % to about 49 mole % diamine; and and
   c. about 17 mole % to about 48 mole 4,4'(2,2,2-trifluoro-1-phenylethylidene)-bipthalic tetracarboxylic acid dialkylester.

4. The high temperature fluorinated polyimides as recited in claim 3 wherein the nadic ester is a 5-norbornene-1,2-dicarboxylic acid anhydride monomethylester.

5. The high temperature fluorinated polyimides as recited in claim 3 wherein the diamine is 4,4'-methylene dianiline.

6. The high temperature fluorinated polyimides as recited in claim 3 wherein the dialkylester is 4,4'(2,2,2-trifluoro-1-phenyl ethylidene)-biphthalic tetra carboxylic acid dimethylester.

* * * * *

UNITED STATES PATENT AND TRADEMARK OFFICE
CERTIFICATE OF CORRECTION

PATENT NO. : 4,801,682
DATED : January 31, 1989
INVENTOR(S) : Daniel A. Scola

It is certified that error appears in the above-identified patent and that said Letters Patent is hereby corrected as shown below:

Column 7, line 24, after "about" --3%-- should be inserted

Signed and Sealed this

Fourth Day of July, 1989

Attest:

Attesting Officer

DONALD J. QUIGG

Commissioner of Patents and Trademarks